United States Patent [19]

Horton et al.

[11] Patent Number: 4,761,827
[45] Date of Patent: Aug. 2, 1988

[54] POLARITY SWITCH FOR SATELLITE TELEVISION RECEIVER

[75] Inventors: Edwin T. Horton, Ballwin, Mo.; William G. Heimbuch, San Antonio, Tex.

[73] Assignee: Satellite Technology Services, Inc., St. Louis, Mo.

[21] Appl. No.: 695,458

[22] Filed: Jan. 28, 1985

Related U.S. Application Data

[63] Continuation-in-part of Ser. No. 650,897, Sep. 17, 1984, abandoned.

[51] Int. Cl.⁴ .................... H04B 1/16; H04N 5/44
[52] U.S. Cl. ........................ 455/277; 455/3; 455/131; 455/140; 333/103; 358/181
[58] Field of Search ............... 455/3, 4, 6, 12, 131, 455/133–135, 140, 277, 278; 333/103; 358/86, 181

[56] References Cited

U.S. PATENT DOCUMENTS

| 2,815,440 | 12/1957 | Fletcher . | |
|---|---|---|---|
| 3,242,433 | 3/1966 | Carlson et al. . | |
| 3,839,676 | 10/1974 | Linnecar . | |
| 4,139,865 | 2/1979 | Iida et al. . | |
| 4,151,557 | 4/1979 | Iida et al. . | |
| 4,205,269 | 5/1980 | Watanabe . | |
| 4,271,403 | 6/1981 | Severson . | |
| 4,352,202 | 9/1982 | Carney . | |
| 4,424,591 | 1/1984 | Boardman . | |
| 4,430,732 | 2/1984 | Saga et al. . | |
| 4,432,015 | 2/1984 | Lambert et al. . | |
| 4,492,937 | 1/1985 | Theriault | 333/103 |
| 4,509,198 | 4/1985 | Nagatomi | 455/277 |
| 4,527,136 | 7/1985 | Kamiya | 455/3 |
| 4,538,175 | 8/1985 | Balbes et al. | 455/12 |
| 4,542,300 | 9/1985 | Nagatomi | 333/103 |

Primary Examiner—Jin F. Ng
Attorney, Agent, or Firm—Rogers, Howell, Moore & Haferkamp

[57] ABSTRACT

A polarity switch for connection between a dual antenna system and a satellite television receiver to permit multiple receivers to simultaneously receive channels of different polarity includes a pin diode switch and input circuitry to decode the standard receiver signal previously used to rotate the antenna feed of a single feed antenna.

21 Claims, 1 Drawing Sheet

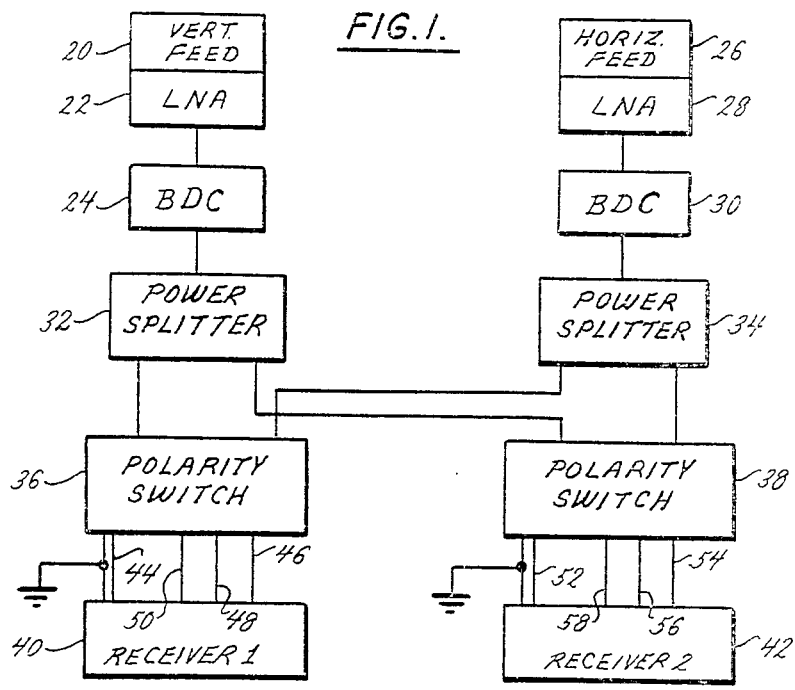
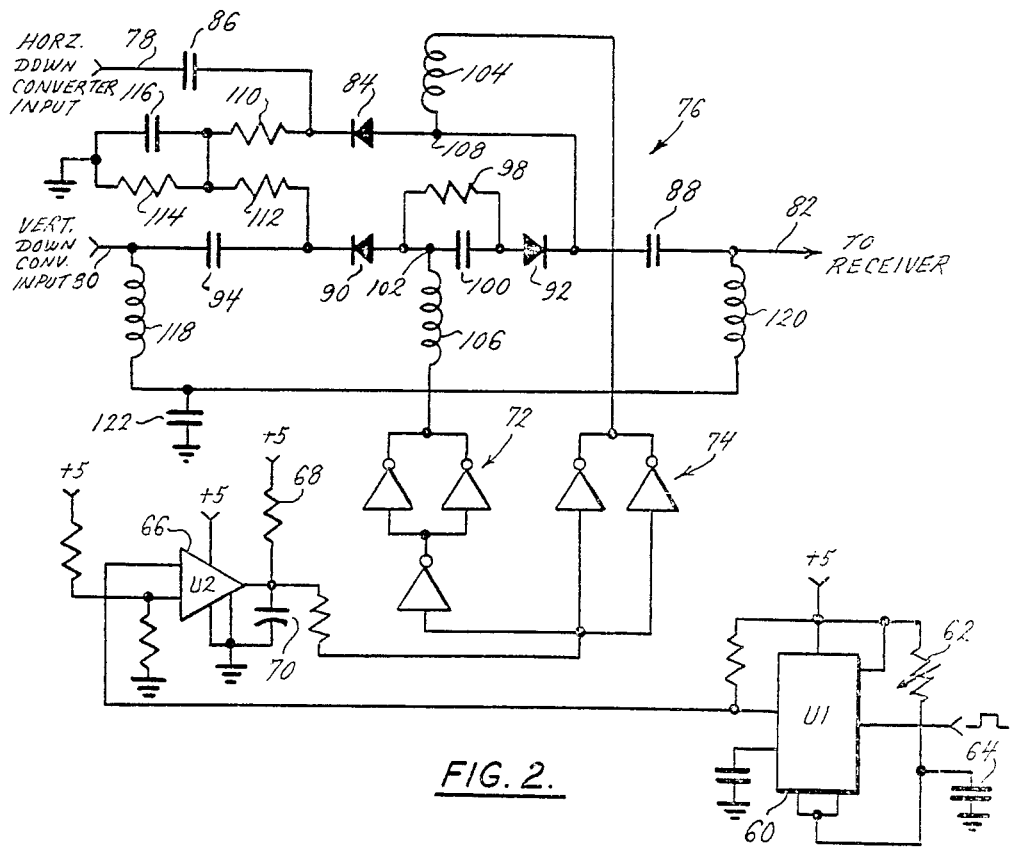

POLARITY SWITCH FOR SATELLITE TELEVISION RECEIVER

BACKGROUND AND SUMMARY

This application is a continuation-in-part of prior U.S. patent application Ser. No. 06/650,897 filed Sept. 17, 1984, now abandoned.

Television receiver systems for capturing satellite transmissions, processing the signals received, and selecting one for reception are well known in the art. Generally, these systems include an antenna and its associated electronics which feeds a group of television channels to a receiver which then processes and selects one of the channels for reception and display on a conventional television set. Generally, each satellite has a number of transponders, and each transponder will transmit a television channel having a horizontal polarity, and also a television channel having a vertical polarity. To receive both polarities, some antenna systems have a feed which can be rotated 90°. This rotation is controlled from the receiver by the viewer selecting the orientation of the antenna feed. Thus, should a viewer decide to view a channel of horizontal polarity, and the antenna feed is already oriented to receive those channels of vertical polarity, he may merely select the other group of channels with a control commonly provided in the receiver which generates a pulse width modulated signal to an antenna feed rotor to rotate it for reception of the other channels.

This arrangement is well known and is commonly used. However, it does have the disadvantage that rotating the antenna feed eliminates reception of one group of television channels and should the viewer have more than one television receiver and television set, only one group of channels may be received and viewed at all sets at any one time. As a partial solution to this problem, antennas have been developed which have a dual feed such that the antenna receives both sets of channels. With an antenna of this configuration, two differentiated television signals are made available at the antenna, one containing horizontal polarity television channels and the other containing vertical polarity television channels. With this arrangement, it would be desirable to select from one polarity to the other at each of the television receivers in the home using the pulse width modulated signal presently generated by the majority of receivers. This would permit viewers in different rooms of the home to select from all of the channels being transmitted by a given satellite, regardless of their polarity. Furthermore, by utilizing the pulse width modulated signal produced by the receiver, no modification would need to be made to the receiver and the remote controls presently used with the receiver would remain fully functional.

The inventors herein have succeeded in developing a polarity switch for interconnection between the horizontal polarity antenna feed, the vertical polarity antenna feed, and each receiver and which has a circuit to decode the receiver generated pulse width modulated selection signal to select which of the groups of channels the viewer desires to view. This permits a viewer to select any channel without restricting the choice of channels available for viewing at the other television sets in the home. Furthermore, as is known in the art, a DC power signal is provided from the receiver and along the same conductor to the electronics at the antenna to power them. Obviously, the DC power signal does not interfere with the RF antenna signal. Therefore, in the prior art, it is common that the same conductor is used to transmit RF in one direction and DC in the other. It is a further design requirement of a polarity switch as disclosed and claimed herein that it conduct a DC power signal to the antenna as required to power the antenna electronics. The polarity switch of the present invention provides such a path to at least one of the antenna circuits, and it is a simple matter to change the connection points for the second polarity switch to power the other antenna feed electronics. Therefore, the additional requirement of passing a DC power signal to the antenna electronics is fully met by the polarity switch of the present invention.

Still another advantage of the polarity switch of the present invention is that it can utilize the existing cable runs between the antenna, which typically is located remote from the home, and the receiver, which is typically inside the home. This avoids the costly addition of cables and their related installation and maintenance.

The foregoing represents a brief description of the invention disclosed and claimed herein which explains some of the advantages of the invention over the prior art. A more detailed and fuller understanding of the invention may be obtained by referring to the drawings and description of the preferred embodiment which follows.

BRIEF DESCRIPTION OF THE DRAWINGS

FIG. 1 is a block diagram of a satellite television reception system showing the interconnections between the antenna electronics, two polarity switches of the present invention, and two receivers;

FIG. 2 is a schematic diagram of one of the polarity switches of the present invention.

DETAILED DESCRIPTION OF THE PREFERRED EMBODIMENT

As shown in FIG. 1, a dual feed antenna system generally comprises a vertical polarity feed 20 with its associated linear noise amplifier 22 and block down converter 24 for converting the frequency of the signal to a lower bandwidth. Also, a dual feed antenna has a horizontal feed 26 with its associated linear noise amplifier 28 and block down converter 30. Each output of the block down converters 24, 30 are input to a pair of power splitters 32, 34 which split the signals and feed them to a pair of polarity switches 36, 38. Each polarity switch 36, 38 has a series of connections connecting it to its associated receiver 40, 42. As shown, polarity switch 36 has a coax cable connection 44 which conducts both the selected antenna feed signal and the DC power signal as shown in greater detail in FIG. 2. There is also a ground connection 46, a plus 5 volts DC power connection 48, and an input signal connection 50 to transmit the pulse width modulated signal generated by the receiver to designate which of the two antenna feeds 20, 26 are desired at receiver 40.

Similarly, the same connections are made between polarity switch 38 and receiver 42. They comprise coax cable connection 52 for transmitting the RF signal and DC power signal, ground connection 54, plus 5 volts DC power connection 56, and input signal connection 58. Thus, as shown clearly in FIG. 1, each polarity switch 36, 38 has both vertical feed and horizontal feed input connections, and an output connection to its associated receiver. The switching between these two antenna feeds is clearly shown in FIG. 2.

Referring now to FIG. 2, the receiver selection signal is input to a timing circuit 60, such as an MC1455 timer, which has an RC circuit comprised of adjustable resistor 62 and capacitor 64 for further differentiating between the two receiver signals as might be generated by the receiver. The adjustable resistor 62 may be used to cause timer 60 to generate a pulse train having pulses with a greater variance in width than that between the two possible input signals, and hence an output signal which has a greater RMS voltage difference between the two signals. Also, adjustable resistor 62 may be changed to cause timer 60 to generate a steady plus 5 volts DC or a nominal 0 volts in response to the two different receiver signals. The output of timer 60 is input to a comparator 66, such as an LM311, and has an RC network comprised of resistor 68 and capacitor 70 for producing a logical 0 at 0 volts and a logical 1 at plus 5 volts at its output in correspondence to the receiver signal input. The output of comparator 66 is then split between a first set of inverters 72 and a second set of inverters 74. Any typical inverter such as a CD4049 may be used. As shown in FIG. 2, the first group of inverters 72 provides two stages of amplification such that its output is at the same logical value as its input. However, the second group of inverters 74 provides only one stage of amplification such that its output is at the reverse logical condition of the input. Therefore, for a comparator 66 output of logical 0, the output of inverter group 72 is logical 0 and the output of inverter group 74 is a logical 1 or plus 5 volts.

The outputs from inverter groups 72, 74 are connected to a pin diode switch circuit 76. As shown, the pin diode switch circuit 76 is connected between the horizontal down converter input 78, the vertical down converter input 80, and the antenna input 82 to the receiver. The pin diode switch circuit 76 includes a first diode 84 in circuit with two DC blocking capacitors 86, 88 between the horizontal down converter input 78 and the antenna input 82 to the receiver. Pin diode switch circuit 76 also includes a first diode 90, a second diode 92, and a pair of DC blocking capacitors 94, 96 between the vertical down converter input 80 and the receiver antenna input 82. Also, a resistor 98 and capacitor 100 are in parallel between circuit node 102 and diodes 90, 92. RF chokes 104, 106 isolate the inverter groups 72, 74 from the RF signals conducted through the pin diode switch circuit 76. A second circuit node 108, along with the first circuit node 102 provide the two control points for the pin diode switch circuit 76. There are also bias resistors 110, 112, 114, and bypass capacitor 116 which complete the pin diode switch circuit 76. A DC bypass filter network comprised of inductors 118, 120 and capacitor 122 provide a DC path between the receiver antenna input 82 and the vertical down converter input 80 for passing DC power to the antenna electronics as previously explained.

OPERATION

The operation of the pin diode switch can be easily explained by referring to circuit nodes 102, 108 and assuming that one of the two possible states have been produced, i.e. that plus 5 volts is applied to circuit node 108 by inverter group 74 and 0 volts has been applied to circuit node 102 by inverter group 72. In that condition, diode 84 is biased on through resistor 110 and RC network 114, 116. Thus, there is an RF signal path between the horizontal down converter input 78 and the receiver antenna input 82. At the same time, diode 90 is back biased through the voltage across RC network 114, 116, remembering that 0 volts is impressed at circuit node 102. Also, diode 92 is back biased by the voltage between circuit node 108 and the RC network 98, 100 in series with diode 92. Thus, the RF signal path is blocked between vertical down converter input 80 and receiver antenna input 82. This ensures that no vertical down converter input RF signal is received by the receiver to interfere with reception of the horizontal feed.

In the second possible condition, a plus 5 volts is applied at circuit node 102 and 0 volts is applied to circuit node 108. In that situation, diode 90 is turned on by the current through resistor 112 and RC network 114, 116. Similarly, diode 92 is turned on through the RC network 98, 100. This therefore completes the path between the vertical down converter input 80 and the receiver antenna input 82. At the same time, the voltage across RC network 114, 116 back biases diode 84 to turn it off and break the path between the horizontal down converter input 78 and the receiver antenna input 82. This eliminates the RF signal path therebetween and ensures no interference by the horizontal feed RF signal with the vertical feed RF signal.

As mentioned above, a DC path is provided through RF chokes or inductors 118, 120 and bypass capacitor 122 to transmit DC current from the receiver to the antenna electronics included in the vertical polarity portion of the antenna system. It is understood by one of ordinary skill in the art that interconnections can be changed for the second polarity switch to provide a DC power path to the horizontal polarity antenna system merely by interchanging the antenna feeds.

Thus, the disclosed invention utilizes the pulse width modulated signal produced by the large majority of receivers presently in the hands of consumers and permits a television viewer to select automatically at his receiver between channels being transmitted with a vertical polarity and channels being transmitted with a horizontal polarity without interfering with the ability of other receivers to also select between channels contained in the vertical feed antenna signal or in the horizontal feed antenna signal.

There are various changes and modifications which may be made to applicants' invention as would be apparent to those skilled in the art. However, any of these changes or modifications are included in the teaching of applicants' disclosure and they intend that their invention be limited only by the scope of the claims appended hereto.

We claim:

1. In a television system for receiving and processing a plurality of television signals, said system including an antenna means for receiving said television signals, said antenna means having a plurality of outputs, each of said outputs being associated with one of said television signals, and a receiver means for processing one of said television signals, said receiver means having means to generate a coded signal indicative of one of said antenna means outputs and TV signal for processing by the receiver means, the improvement comprising a switching means for connection between the antenna means and the receiver means, said switching means having means to decode the receiver means signal and produce an output corresponding to the selected one of said antenna outputs and TV signal, and means to connect one of said television signals to the receiver means for processing in response to the decoded receiver means signal.

2. The device of claim 1 wherein the receiver means signal is a pulse width modulated signal.

3. The device of claim 1 wherein the decoding means further comprises means to detect the receiver means signal and produce a logic signal in response thereto, a logic means connected to the decoding means, the logic means having means to produce a switching signal in response to the logic signal, and an electronic switching circuit means connected to the logic means and interconnected between the antenna means outputs and the receiver means.

4. The device of claim 3 wherein the logic means includes means to amplify the logic signal.

5. The device of claim 4 wherein the logic means comprises at least two inverters connected in series to amplify the logic signal and produce a first output signal and at least one other inverter connected to amplify and invert the logic signal and produce a second output signal, said first and second output signals comprising the switching signal.

6. The device of claim 5 wherein the electronic switching circuit means comprises a pin diode switch means, said pin diode switch means having at least two states, said logic means being connected to the pin diode switch means so that as the first and second logic means output signals change, said pin diode switch means changes from one state to another.

7. The device of claim 6 wherein the decoding means comprises means to process the receiver means signal to produce an intermediate signal corresponding to each receiver signal, the intermediate signals having a greater difference in their RMS values than the difference in RMS value of the receiver means signals.

8. The device of claim 7 wherein the decoding means includes means to process the intermediate signal to produce the logic signal.

9. The device of claim 3 wherein the electronic switching circuit means includes a pin diode switch circuit.

10. The device of claim 9 wherein the pin diode switch circuit includes a diode connected between each of said antenna outputs and the receiver means, and the logic means has means to produce a switching signal which forward biases only one of said diodes at any one time.

11. The device of claim 3 wherein the switching means further comprises a low pass filter means connected between at least one of the antenna means outputs and the receiver means.

12. The device of claim 1 wherein the television signals comprise a first signal having a plurality of channels, each channel having an assigned frequency bandwidth, and a second signal having a second plurality of channels, each of said second plurality of channels having an assigned frequency bandwidth.

13. The device of claim 12 wherein the first television signal is comprised of channels broadcast from a satellite and having a first polarity, and the second television signal is comprised of channels broadcast from a satellite and having a second polarity.

14. The device of claim 13 wherein the first polarity is vertical and the second polarity is horizontal.

15. A polarity switch adapted for connection between at least two satellite television antenna outputs and a satellite television receiver, each of said antenna outputs being associated with a television signal, the receiver having means to generate a logically encoded signal indicative of one of said antenna outputs and its associated television signal for processing by the receiver, the polarity switch comprising means to decode the receiver signal and produce a logic signal in response thereto, the logic signal being indicative of one of the antenna outputs, and means to electrically connect one of said antenna outputs to the receiver for transmission of its associated television signal to the receiver for processing in response to the decoded receiver signal.

16. The switch of claim 15 further comprising a logic means connected to the decoding means, the logic means having means to produce a switching signal in response to the logic signal, and an electronic switching circuit means connected to the logic means and interconnected between the antenna outputs and the receiver.

17. The switch of claim 16 wherein the electronic switching circuit means comprises a pin diode switch circuit.

18. The switch of claim 17 wherein the logic means includes means to amplify the logic signal and means to amplify and invert the logic signal.

19. The switch of claim 18 further comprising a DC power circuit connected between the receiver and at least one of the antenna outputs.

20. The switch of claim 19 wherein the decoding means includes a processing means for producing an intermediate signal corresponding to each receiver signal, the intermediate signals having a greater difference in their RMS values than the difference in the RMS values of the receiver signals.

21. The switch of claim 20 wherein the decoding means further comprises a comparator means for comparing the intermediate signal with a reference voltage and producing a logic signal in response thereto.

* * * * *